Sept. 15, 1970 I. MOSKOVITZ ET AL 3,529,079
COLOR BAR GENERATOR
Filed March 23, 1967 2 Sheets-Sheet 1
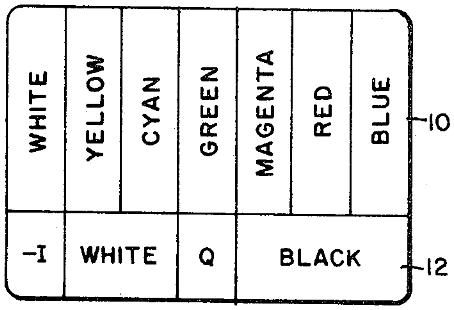
FIG. I.
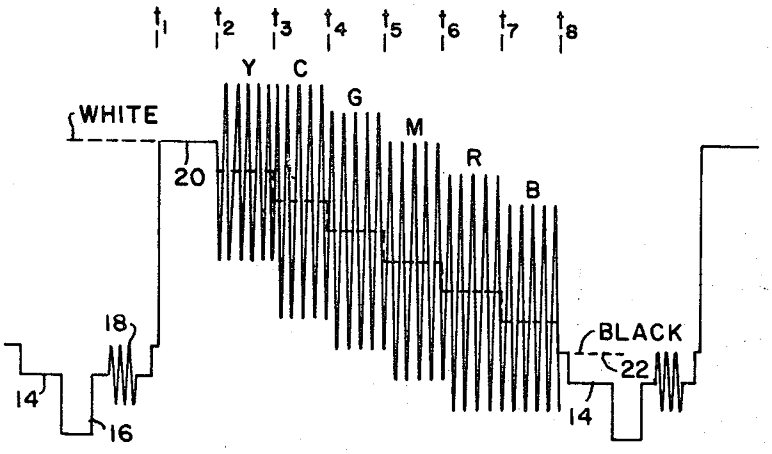
FIG. 2A.
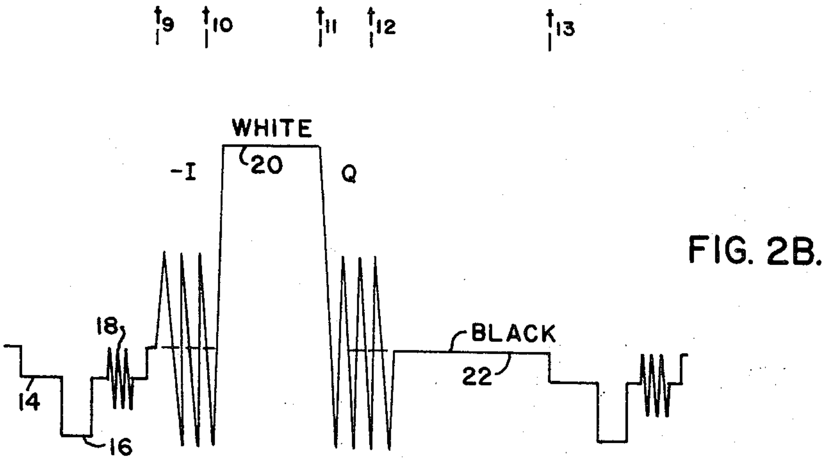
FIG. 2B.
INVENTORS
Irving Moskovitz and
George E. Petrilak.
BY
ATTORNEY Sept. 15, 1970 I. MOSKOVITZ ET AL 3,529,079

COLOR BAR GENERATOR

Filed March 23, 1967 2 Sheets-Sheet 2

INVENTORS
Irving Moskovitz and
George E. Petrilak.
BY
T. N. Spencer
ATTORNEY

United States Patent Office 3,529,079
Patented Sept. 15, 1970

3,529,079

COLOR BAR GENERATOR

Irving Moskovitz, Roslyn Heights, and George E. Petrilak, Kings Park, N.Y., assignors, by mesne assignments, to Ward Electronic Industries, a corporation of New Jersey Filed Mar. 23, 1967, Ser. No. 625,417
Int. Cl. H04n 9/12
U.S. Cl. 178—5.4 19 Claims

ABSTRACT OF THE DISCLOSURE

This invention relates to apparatus for generating chroma test signals, and more particularly to a television color bar generator in which color carrier signals of various phase relationships denoting colors in the spectrum are derived from a delay line and displayed in succession during each horizontal scan of a television receiving tube by means of switching apparatus controlled by a pulse counter.

BACKGROUND OF THE INVENTION

As is known, color bar generators utilized in the color television field provide various chroma signals which can be used for the adjustment and troubleshooting of color TV equipment. In the usual case, the color bar generator produces a test signal resulting in a color bar pattern on the screen of a TV receiving tube. Since the correct or desired color of each bar is known, the loss of a particular component can be observed; and the test signal, having components with known phase relationships, can be easily traced through equipment being tested to locate a fault.

SUMMARY OF THE INVENTION

Prior art equipment for generating a color bar pattern is rather bulky and complex and not altogether satisfactory. Accordingly, as one object, the present invention seeks to provide an improved color bar generator of simplified construction.

Another object of the invention is to provide a color bar generator in which signals denoting the discrete primary and secondary colors in the spectrum are derived from a phase shifting device.

Still another object of the invention is to provide a digital color bar generator employing a delay line as a phase shifting device to derive directly therefrom for the primary and secondary colors, chroma signals of various phase relationships, and including switching means controlled by a pulse counter for displaying the chroma signals representing discrete colors successively during each horizontal scan of a television receiving tube.

In accordance with the invention, there is provided a television encoded color bar generator comprising phase shift means having an input terminal for the application thereto of a subcarrier signal and a plurality of output terminals at least equal in number to the number of primary and secondary colors. The phase shift means is operative to produce at its output terminals, chrominance signals which are respectively shifted in phase with respect to the subcarrier input signal by varying phase amounts respectively corresponding to a given formulation, such as the NTSC system, for the primary and secondary colors. There is further provided digital switch means having a plurality of input terminals for the respective individual application thereto of the chrominance signals from the phase shift means and an output terminal. The digital switch means is operative to sequentially apply the chrominance signals to the input of a display device in succession during each scan period of the display device.

Preferably the aforesaid switch devices comprise normally cut-off transistors having their bases coupled to the taps on the delay line; while the means for controlling the switch devices comprises a pulse counter formed from cascaded binary units which are connected to the emitters of the transistor switches through a diode matrix such that the switches will be turned on in sequence.

Further, in accordance with the invention, means are provided for simultaneously producing two different color bar patterns and for displaying one on the upper portion of a TV receiving tube and the other on the lower portion. Both patterns are derived from the same delay line, but controlled by separate switching systems of the type described above. The outputs of the respective switching systems are then applied to the receiving tube in timed sequence during the vertical scan of the election beams over the face of the tube, thereby producing the aforesaid upper and lower patterns.

The above and other objects and features of the invention will become apparent from the following detailed description taken in connection with the accompanying drawings which form a part of this specification and in which:

FIG. 1 is a schematic illustration of the color bar pattern produced on a television receiving tube by the color bar generator of the invention;

FIG. 2A depicts the waveform produced by the color bar generator of the invention during one horizontal scan of the electron beam across the face of the tube to produce the pattern shown on the upper portion of the screen of FIG. 1;

FIG. 2B illustrates the waveform produced by the color bar generator of the invention during one horizontal scan of the electron beam across the face of the tube to produce the pattern shown on the lower portion of the screen of FIG. 1.

Figure 3:
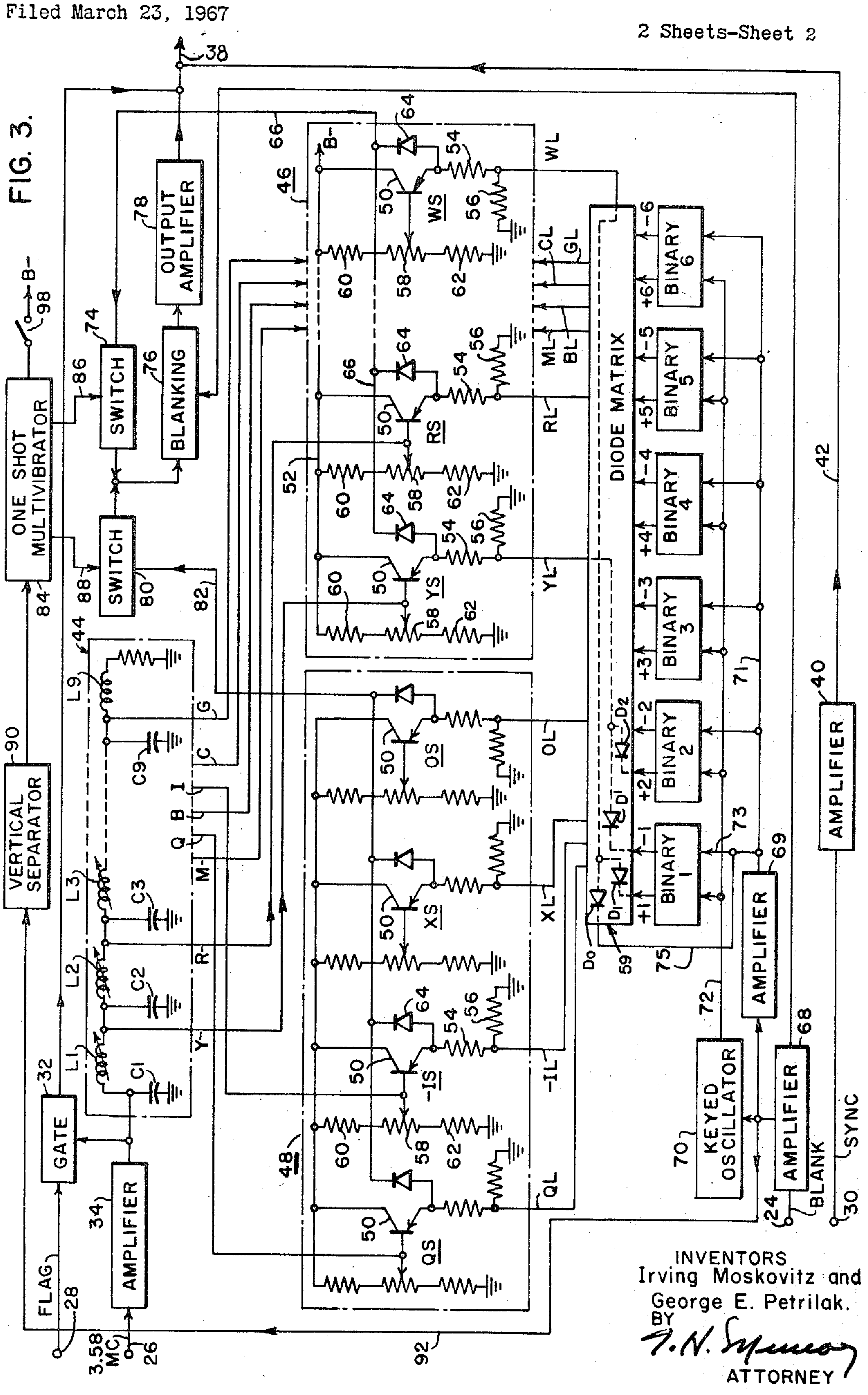
FIG. 3 is a functional block and schematic circuit diagram of the color bar generator of the invention, in a preferred embodiment thereof.

With reference now to the drawings, and particularly to FIG. 1, the color bar pattern produced by the generator of the invention is shown. The pattern is divided into an upper portion 10 and a lower portion 12. The upper portion 10, in turn, is divided into seven color stripes or bars comprising the hues white, yellow, cyan, green, magneta, red and blue. The lower portion, on the other hand, is divided into four areas representing white, black, the hue produced by a —I television test signal, and the hue produced by a Q television test signal.

The waveform required for the upper pattern 10 during one horizontal sweep of the electron beam across the face of the television tube is shown in FIG. 2A. The waveform includes a blanking pulse 14 having superimposed thereon a sync pulse 16 and a color burst 18 having a frequency of 3.58 megacycles. In accordance with conventional color television procedures, the phase of the color burst signal 18 is compared in a receiver with that of the various chroma signals following the blanking pulse to demodulate the signal and produce the proper colors on the screen. In FIG. 2A, two blanking pulses 14 are shown; and between the blanking pulses, the electron beam of the television receiving tube scans across one horizontal line. The white luminance level of the video signal is illustrated in FIG. 2A by the line 20; while the black luminance level is illustrated by the line 22.

During the first part of the horizontal sweep between times $t_1$ and $t_2$, the video signal is at the white luminance level 20 and has no chrominance component. This produces the white stripe or bar in the upper half 10 of the screen shown in FIG. 1. Thereafter, successive chrominance signals for the hues yellow, cyan, green, magneta, red and blue appear in the waveform and comprise 3.58 megacycle color carrier signals which are shifted in phase with respect to the 3.58 megacycle color burst 18. That is, in the color receiver, the phase of the yellow signal, for example, is compared with the phase of the unmodulated 3.58 megacycle color burst 18 to produce the proper conditions for the appearance of yellow on the color TV screen. The same is true of the various other colors, each of which is represented by a 3.58 megacycle signal with a particular amplitude or luminescence level and shifted in phase by a specified amount with respect to the color burst signal 18.

In FIG. 2B, the video signal is illustrated for a horizontal sweep of the electron beam over the lower half 12 of the screen shown in FIG. 1. Again, the video signal includes a blanking pulse 14 having a sync pulse 16 superimposed thereon, together with a 3.58 megacycle color burst 18. In this case, however, a phase modulated 3.58 megacycle signal occurs immediately following the blanking pulse 14. This signal is shifted in phase with respect to the color burst 18 to produce a —I color signal. Following the —I color test signal, the video signal assumes the white level 20 until a 3.58 megacycle Q signal is generated, followed by the video wave shape returning to the black level 22. As will be understood, this produces the display 12 shown on the lower portion of the screen of FIG. 1.

The circuitry for generating the signals shown in FIGS. 2A and 2B is illustrated in FIG. 3. The inputs to the circuitry include a source of blanking pulses applied to terminal 24, a 3.58 megacycle color carrier signal applied to terminal 26, a flag pulse applied to terminal 28, and a sync pulse applied to terminal 30. The flag pulse on terminal 28, which is in phase or coincident with the color burst 18 shown in FIGS. 2A and 2B, is applied to a gate circuit 32 which is utilized to gate the output of amplifier 34 comprising the unmodulated 3.58 megacycle color carrier. Thus, the output of the gate circuit 32 comprises a series of color bursts 18 which are simply applied by lead 36 to the output at 38. Similarly, the sync pulses applied to terminal 30 are amplified in amplifier 40 and applied via lead 42 to the output at 38.

The 3.58 megacycle carrier signal at the output of amplifier 34 is also applied to a delay line 44 which comprises inductors L–1 through L–9 connected in series between the output of amplifier 34 and ground. The input to the delay line and the junctions between the respective inductors L–1 through L–9 are connected to ground through capacitors C–1 through C–9. All of the inductors except the last inductor L–9 are adjustable to thereby vary the phase of the signal along the delay line.

Connected to the junctions of inductors L–1 and L–2 is a lead Y. Thus, a 3.58 megacycle signal, shifted in phase with respect to the output of amplifier 34 by about 12° appears on lead Y whereby it constitutes a yellow chrominance signal. Similarly, the junction between inductors L–2 and L–3 is connected to lead R whereby a 3.58 megacycle chrominance signal appears on the lead R. This signal is shifted in phase with respect to the input signal by about 76.5° such that it constitutes a red chrominance signal. Likewise, the lead M is connected between inductors L–3 and L–4; the lead Q is connected between inductors L–4 and L–5; the lead B is connected between inductors L–5 and L–6; the lead —I is connected between inductors L–6 and L–7; the lead C is connected between the inductors L–7 and L–8; and the last lead G is connected between the inductors L–8 and L–9. With this arrangement, the signal appearing on lead M will be shifted in phase with respect to the reference burst input by about 119.9°, whereby it constitutes a magenta chrominance signal; that on lead Q will be shifted in phase by 147°; that on lead B will be shifted in phase by 192° whereby it constitutes a blue chrominance signal; that on lead —I will be shifted in phase by 237°; that on lead C will be shifted in phase by 256.5° whereby it constitutes a cyan chrominance signal; and, finally that on lead G will be shifted in phase by 299.9° whereby it constitutes a green chrominance signal. The leads Y, R, M, B, C and G are connected to a color switch, enclosed by broken lines and identified by the reference numeral 46. In a similar manner, leads Q and —I are connected to an IQ switch also enclosed by broken lines and identified by the reference numeral 48.

With reference, first, to the color switch 46, it comprises a plurality of individual switches identified as YS through WS, only the YS, RS and WS switches being shown in detail. Considering the YS switch, it comprises a transistor 50 having its collector connected to a source of B— potential via lead 52. The emitter of transistor 50 is connected through resistors 54 and 56 to ground; and is also connected to a diode matrix or logic system 59. The base of the transistor 50 is connected to the movable tap on a potentiometer 58. As shown, the potentiometer 58 is connected in series with resistors 60 and 62 between the source of B— potential and ground. Also connected to the base of the transistor 50 is the lead Y such that a chroma signal, having a phase representing the color yellow, will appear at the emitter of the transistor 50 when it conducts. Connected to the emitter of transistor 50 is the anode of a diode 64 having its cathode connected to a common lead 66, the arrangement being such that when the transistor 50 conducts, a chroma signal having a phase representing the color yellow will appear on the common lead 66. The remaining color switches RS through WS are identical to the color switch YS, it being understood that there are additional color switches MS, DS, CS and GS not shown in FIG. 3.

Reverting again to the blanking pulse applied to input terminal 24, it is amplified in amplifier 68 and applied to a keyed oscillator 70 such that the oscillator 70 will generate output oscillations on the lead 72 between the trailing edge of a blanking pulse in the video waveform of FIG. 2A or 2B and the leading edge of the next successive blanking pulse in the video waveform. The output oscillations from the oscillator 70 are applied via lead 72 to a pulse counting apparatus comprising six binary units or flip-flops connected in cascade and identified as binary 1 through binary 6. Each of the binaries is provided with two output leads which, in the case of binary 1, for example, are identified as +1 and —1. Similarly, the output leads from binary 2 are identified as +2 and —2, and so on. As the binary counter counts the pulses or oscillations from the oscillator 70, selected ones of the output leads from the binaries will be energized or "ON" while others are deenergized or "OFF." The output leads from the binaries are, in turn, connected to the diode matrix 58 which will energize a selected one of the leads YL through WL, depending upon the count stored in the binary counter.

The counter formed from the binaries 1 through 6 is of the gated type. That is, the blanking pulse from amplifier 68 is inverted in amplifier 69 and applied to all of the binaries via lead 71. This enables all of the binaries; and upon occurrence of the leading edge of the next blanking pulse, the binaries are reset. Pulses from the oscillator 70 are applied to all of the binaries in parallel via lead 72. The first binary is caused to shift upon receipt of a pulse on lead 72 and when both of its inputs are energized or "ON" from the output of amplifier 69 via leads 73 and 75. Thus, the first binary shifts after the trailing edge of a blanking pulse shown in FIG. 2A or 2B and before receipt of the first pulse from oscillator 70; the second binary shifts upon receipt of the first pulse, the third shifts upon receipt of the second and so on until six pulses are counted, provided for seven discrete time periods. In this manner, the output of each binary enables the next succeeding binary, i.e. each binary will shift from one stable state to the other only when the next preceding binary undergoes a shift in state.

As indicated in FIG. 3, each of the input leads WL, YL, RL, etc. to the transistor switches WS, YS, RS, etc. of color switch 46, are respectively connected to a pair of diodes in matrix 59. Thus, diodes $D_0$ and $D_1$ have their anodes jointly connected to lead YL and diodes $D^1$ and $D_2$ are similarly connected to lead YL.

As the counter counts, the states (i.e., energized or deenergized) of the output leads of the binaries will reverse. The +1 output lead of binary 1 is connected to lead WL through diode $D_1$ schematically shown in the diode matrix 59. Likewise the output of amplifier 69, comprising the inverted blanking pulse, is applied through diode $D_0$ in matrix 59 to lead WL. Before the lead WL will be deenergized to ground the emitter of transistor 50 in switch WS through resistor 56, the signals on the cathodes of both diodes $D_0$ and $D_1$ must be in a plus condition. This will occur for the lead WL when the trailing edge of a blanking pulse is reached. When the first pulse from oscillator 70 is applied to the binaries, binary 1 will switch stable states, whereby the signal on the cathode of diode $D_1$ connected to lead WL is minus, whereupon switch WS cuts off. At the same time, the change-in-state output of binary 1 is applied to binary 2 via diodes $D^1$ and $D_2$ and the signals on the cathodes of both of the diodes $D^1$ and $D_2$ connected to lead YL become plus, whereby switch YS closes. On the second pulse from oscillator 70, lead CL becomes deenergized since it is connected through diodes in matrix 59 to the —2 and +3 outputs from the binaries. Similarly, lead GL is connected through diodes to outputs —3 and +4; lead ML is connected through diodes to outputs —4 and +5 lead RL is connected through diodes to outputs —5 and +6 and lead BL is connected through a single diode to the —6 output. In this manner, the output from the switch WS is applied through its diode 64 to the common lead 66 between the times $t_1$ and $t_2$ shown in FIG. 2A. At time $t_2$, the lead WL will be deenergized and lead YL will be energized, thereby enabling the switch YS. When switch YS is energized, a 3.58 megacycle color carrier signal having its phase shifted by the delay line 44 so as to represent the color yellow appears at the emitter of transistor 50 in switch YS and is applied through the diode 64 to lead 66 between times $t_2$ and $t_3$ shown in FIG.2A. Similarly, between times $t_3$ and $t_4$ the switch CS, not shown in FIG. 3, will be enabled; between times $t_4$ and $t_5$, the switch GS, also not shown in FIG. 3, will be enabled; and so on whereby the waveform between times $t_1$ and $t_8$ in FIG. 2A will appear on the lead 66. Assuming that switch 74 is closed, the waveform on lead 66 will be applied to a blanking circuit 76 where the blanking pulses 14 are added to the video signal as shown in FIG. 2A. The resulting waveform, in turn, is amplified in output amplifier 78 and applied to the output lead 38 where the color burst 18 on lead 36 and the sync pulse on lead 42 are applied thereto, thereby producing the completed waveform of FIG. 2A.

As will be understood, the waveform shown in FIG. 2A will appear on output lead 38 only so long as the switch 74 is closed. When the switch 74 is open, the waveform shown in FIG. 2A appearing between times $t_1$ and $t_8$ cannot reach the output lead 38. The switch 74 operates in conjunction with a second switch 80, the input to which is from the IQ switch 48 via lead 82. Switches 74 and 80 are controlled by a one-shot multivibrator 84. As is well known to those skilled in the art, a one-shot multivibrator is a bistable circuit having stable and unstable states and which is operative in response to an input signal to shift from its stable state to its unstable state where it will remain for a predetermined period of time after which it will automatically switch back to its stable state. During one state of the one-shot multivibrator, lead 86 will be energized or "ON" whereby the switch 74 will be closed and switch 80 open. When the multivibrator switches to its other states, the lead 88 will be energized, thereby closing switch 80 and opening switch 74.

The input to the one-shot multivibrator 84 is from a vertical separator circuit 90, the input to which is connected via lead 92 the output of the amplifier 68. In accordance with well-known television technology, the end of a vertical sweep in the video waveform is indicated by a series of rapid pulses, as distinguished from the relatively widely separated blanking pulses shown in FIG. 2A. The occurrence of the rapidly occurring pulses is detected by the vertical separator circuit 90 and utilized to trigger the one-shot multivibrator 84. The one-shot multivibrator 84, in turn, is designed such that it will switch from one stable state to the other for a period of time approximating something over one-half the time required for a vertical sweep, whereupon it will switch back to its original stable state. During the first portion of the vertical sweep, the one-shot multivibrator 84 switches and energizes lead 86 whereby switch 74 is closed, enabling the waveform of FIG. 2A to pass to the output lead 38 such that the pattern shown in the upper portion 10 of the television tube screen of FIG. 1 is produced. However, at a point during the vertical sweep cycle, the one-shot multivibrator 84 will revert back to its original stable state to energize lead 88 and close switch 80, thereby causing the video waveform on lead 82 to pass through switch 80 and appear on the output 38 to produce the lower pattern 12 shown in FIG. 1.

It remains to be explained how the video waveform on lead 82 is produced. As can be seen, the IQ switch 48 is similar to the color switch 46 and includes a plurality of individual transistor switches identified as QS, IS, XS and OS. As was the case with the color switch 46, each of the individual switches such as switch QS, for example, includes a transistor 50 having its emitter connected to ground through resistors 54 and 56 and its collector connected to a source of B— potential. The base of the transistor 50, in turn, is connected to the movable arm on the potentiometer 58 whose resistor portion is included in a series string between the B— voltage source and ground along with resistors 60 and 62.

During each horizontal sweep of the electron beam, the lead —IL will be energized first, thereby enabling switch —IS to pass the 3.58 megacycle color carrier signal on lead —I through diode 64 to the common lead 82. From lead 82, the signal passes through the switch 80, blanking circuit 76 and output amplifier 78 to the output lead 38. Lead —IL will be energized or "ON" between times $t_9$ and $t_{10}$ shown in FIG. 2B. At time $t_{10}$, lead —IL will be deenergized and lead XL will be energized to enable switch XS, whereby the video wave shape shown in FIG. 2B will assume the white luminance level 20. This condition will continue until time $t_{11}$ is reached, whereupon lead XL will be deenergized and lead QL will be energized. Lead QL will be energized between $t_{11}$ and $t_{12}$ in FIG. 2B, whereby a 3.58 megacycle color carrier signal, shifted in phase by the delay line 48 to have a phase corresponding to a television Q signal, will appear at the emitter of the transistor 50 in switch QS and pass through its associated diode 64 to the common lead 82.

Finally, at time $t_{12}$ in FIG. 2B, lead OL will be energized to enable the switch OS. The bias level on the base of the transistor 50 of switch OS is adjusted via the movable tap on its potentiometer 58 such that the output from the switch is a steady state signal having an amplitude at the black level as shown in FIG. 2B between times $t_{12}$ and $t_{13}$. The necessary time division to produce the waveform of FIG. 2B is obtained by connecting lead —IL through two diodes in matrix 59 to the output of amplifier 69 and the output +1; by connecting lead XL through two diodes to outputs —1 and +3; by connecting lead QL through two diodes to outputs —3 and +4; and by connecting lead OL through a single diode to output —4.

The foregoing description assumes, of course, that the color bar pattern of FIG. 1 is divided into the upper and lower parts 10 and 12 as shown. However, should the switch 74 remain closed during the entire vertical sweep cycle, the color bars shown in the upper half of the screen on FIG. 1 will extend down to the bottom. Similarly, if switch 80 is closed during the entire vertical sweep, the lower pattern 12 would cover the entire screen. In this connection, a switch 98 is provided for the one-shot multivibrator 84 whereby the lead 86 may be continuously energized, thereby causing the upper pattern 10 as shown in FIG. 1 to extend for the length of the entire screen. Thus, both of the patterns shown in FIG. 1 may be produced, or the entire screen may be covered by the color bars shown in the upper half 10 of FIG. 1.

Although the invention has been shown in connection with a certain specific embodiment, it will be readily apparent to those skilled in the art that various changes in form and arrangement of parts may be made to suit the requirements without departing from the spirit and scope of the invention.

We claim as our invention:

1. A television encoded color bar generator comprising phase shift means having an input terminal for the application thereto of a subcarrier signal and a plurality of output terminals at least equal in number to the number of primary and secondary colors in a given color television system, said phase shift means being operative to produce at its said output terminals respectively, chrominance signals which are respectively phase shifted with respect to said subcarrier input signal by varying phase amounts respectively corresponding to a given formulation for the primary and secondary colors in said given color television system, and digital switch means having a plurality of input terminals for the respective individual application thereto of said chrominance signals from said phase shift means, and an output terminal, said digital switch means being operative to sequentially apply at its said output terminal said chrominance signals to the input of a display device in succession during each scan period of said display device.

2. A color bar generator as defined in claim 1 wherein said digital switch means comprises a first bank of gates each of said gates having a signal input terminal connected to a corresponding one of said phase shift output terminals for the application thereto of one of said chrominance signals, a gated output terminal and a gating input terminal, and timing means for sequentially applying gate control signals to said gating input terminals whereby each of said gates of said first bank is in succession rendered exclusively into the gate-pass condition with the remaining gates being in the gate-close condition for preselected periods of time during the scan period of said display device.

3. A color bar generator as defined in claim 2 wherein said phase shift means is operative to produce at its said output terminals at least one phase modulated hue test signal in addition to said chrominance signals representing the primary and secondary colors.

4. A color bar generator as defined in claim 3 wherein said phase shift means is operative to produce first and second phase modulated hue test signals at a pair of its said output terminals.

5. A color bar generator as defined in claim 2 wherein said timing means comprises a diode matrix having a plurality of output terminals respectively connected to said gating input terminals, a chain of binaries in cascade and connected to said diode matrix, and a pulse generator having its output jointly connected to the trigger inputs of each of said binaries in said chain.

6. A color bar generator as defined in claim 5 wherein said diode matrix comprises a plurality of diode pairs corresponding to the number of binaries in said chain, the diodes of each of said pairs being jointly connected at one end to said gating input terminals and at the other ends to the output terminals of a corresponding pair of adjoining binaries in said chain.

7. A color bar generator as defined in claim 2 wherein each of said chrominance signals appearing at the output terminal of said digital switch means comprises a pedestal component and a phase modulated subcarrier component.

8. A color bar generator as defined in claim 7 wherein each of said gates of said first gate bank includes a selectively variable D.C. voltage source connected to its said signal input terminals for determining said pedestal component in the chrominance signal at the output terminal of said digital switch means.

9. A color bar generator as defined in claim 7 wherein said chrominance signal subcarrier component is determined by said varying phase amounts produced by said phase shift means.

10. A color bar generator as defined in claim 2 where said first bank of gates further includes an additional gate having a signal input for the application thereto of a monosignal representing a white luminence level and a gating input terminal connected to said time means for the application thereto of said gate control signals.

11. A color bar generator as defined in claim 4 wherein said digital switch means includes a second bank of gates comprising a pair of hue test gates each having a signal input gate respectively connected to said pair of phase shift means output terminals providing said first and second phase modulated hue test signals and each having a gating input terminal connected to said timing means for the application thereto of said gate control signals.

12. A color bar generator as defined in claim 11 wherein each of said hue test gates of said second gate bank includes a selectively variable D.C. voltage source connected to its said signal input terminal for determining the pedestal component in the output signal at the output terminal of said digital switch means.

13. A color bar generator as defined in claim 11 wherein said second gate bank includes at least one additional gate having a signal input terminal for the application thereto of a monosignal representing a given luminence level and a gating input terminal connected to said timing means for the application thereto of said gate control signals.

14. A color bar generator as defined in claim 13 wherein said second gate bank includes first and second additional gates for the application thereto at their respective signal input terminals first and second monosignals representing white and black luminence levels respectively.

15. A color bar generator as defined in claim 11 wherein said first bank of gates has a common first gate bank output terminal.

16. A color bar generator as defined in claim 15 wherein said second bank of gates has a common second gate bank output terminal.

17. A color bar generator as defined in claim 16 wherein said television display device comprises a color television receiver tube having a signal display input.

18. A color bar generator as defined in claim 17 wherein said digital switch means includes a display switch device having first and second video signal input terminals respectively connected to said first gate bank common output and said second gate bank common output terminals, said display switch device being operative to alternately connect said first and second gate bank common output terminals to said receiver tube signal display input at least once during the vertical sweep of an electron beam across the face of said tube whereby a first pattern representing the video signal on said first gate bank common output terminal appears on one portion of said tube face and a second pattern representing the video signal on said second gate bank common output terminal appears on another portion of said tube face.

19. A color bar generator as defined in claim 1 wherein said phase shift means comprises a delay line having an input terminal and a plurality of output taps spaced from each other along the length of said delay line, said output taps providing chrominance output signals of varying phase shifts with respect to the subcarrier signal applied to said delay line input terminal.

References Cited

UNITED STATES PATENTS 3,019,289 1/1962 Machlis ------------ 178—5.4

OTHER REFERENCES

Sobel: "CRTSA Color Symposium: Report 2 On A Color Bar Generator," pp. 30, 31, 58, Service, June 1954.

ROBERT L. GRIFFIN, Primary Examiner

R. L. RICHARDSON, Assistant Examiner

U.S. Cl. X.R.

328—187